United States Patent
He et al.

(10) Patent No.: US 11,254,190 B2
(45) Date of Patent: Feb. 22, 2022

(54) VAPOR INJECTION HEAT PUMP AND CONTROL METHOD

(71) Applicant: FORD GLOBAL TECHNOLOGIES, LLC, Dearborn, MI (US)

(72) Inventors: Jing He, Novi, MI (US); Loren John Lohmeyer, III, Monroe, MI (US); Manfred Koberstein, Troy, MI (US); Mikiharu Kuwahara, Aichi (JP); Masafumi Nakashima, Aichi (JP)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 16/444,665

(22) Filed: Jun. 18, 2019

(65) Prior Publication Data
US 2020/0398645 A1 Dec. 24, 2020

(51) Int. Cl.
*B60H 1/32* (2006.01)
*B60H 1/00* (2006.01)
(Continued)

(52) U.S. Cl.
CPC ....... *B60H 1/3213* (2013.01); *B60H 1/00321* (2013.01); *B60H 1/00385* (2013.01);
(Continued)

(58) Field of Classification Search
CPC ...... F25B 2400/13; F25B 41/04; F25B 30/02; F25B 2400/23; F25B 2500/18;
(Continued)

(56) References Cited

U.S. PATENT DOCUMENTS

| 1,408,593 A | * | 3/1922 | Haslam | F25B 41/062 62/509 |
| 3,195,319 A | * | 7/1965 | Wolff | F25B 41/04 62/196.4 |

(Continued)

FOREIGN PATENT DOCUMENTS

WO WO-2017199167 A1 * 11/2017 ................ F25B 1/10

OTHER PUBLICATIONS

John J. Meyer et al.; "Range Extension Opportunities While Heating a Battery Electric Vehicle"; SAE International; SAE Technicial Paper 2018-01-0066; Apr. 3, 2018; pp. 1-10.

*Primary Examiner* — Frantz F Jules
*Assistant Examiner* — Jason N Thompson
(74) *Attorney, Agent, or Firm* — David Coppiellie; Price Heneveld LLP (57) ABSTRACT

A refrigerant loop of a vapor injection heat pump includes a compressor, first and second expansion valves, and first and second separator valves. The separator valves allow an entire refrigerant flow to pass therethrough or operate to separate vapor and liquid components of expanded refrigerant and inject the vapor component into a suction port of the compressor. Vapor injection occurs in both heating and cooling modes of operation and may depend upon an ambient condition (e.g., high or low ambient temperatures). An accumulator receives an output refrigerant of the heat exchangers dependent upon the mode and directs a vapor component into another suction port of the compressor. A control module controls at least the first and second expansion valves and first and second separator valves dependent upon the mode of operation which include, among others, heating, cooling, and dehumidification and re-heating.

17 Claims, 6 Drawing Sheets

(51) Int. Cl.
 *B60H 1/22* (2006.01)
 *F25B 30/02* (2006.01)
 *F25B 41/26* (2021.01)

(52) U.S. Cl.
 CPC ........... *B60H 1/00907* (2013.01); *B60H 1/22* (2013.01); *B60H 1/323* (2013.01); *F25B 30/02* (2013.01); *F25B 41/26* (2021.01); *B60H 2001/00928* (2013.01); *B60H 2001/3238* (2013.01); *B60H 2001/3267* (2013.01); *F25B 2313/029* (2013.01); *F25B 2400/13* (2013.01); *F25B 2400/23* (2013.01); *F25B 2500/18* (2013.01); *F25B 2500/28* (2013.01); *F25B 2600/2513* (2013.01)

(58) Field of Classification Search
 CPC ......... F25B 2500/28; F25B 2600/2513; B60H 1/3211; B60H 1/3213; B60H 1/3216; B60H 1/00385; B60H 1/00907; B60H 1/2215; B60H 1/323; B60H 2001/00928
 USPC .............. 137/118.06, 115.13, 115.23, 115.25
 See application file for complete search history.

(56) References Cited

U.S. PATENT DOCUMENTS

| | | | | |
|---|---|---|---|---|
| 5,103,650 A * | 4/1992 | Jaster | ............... | F25B 1/10 62/198 |
| 5,692,394 A * | 12/1997 | Ozaki | ............... | F25B 1/10 62/509 |
| 5,752,391 A * | 5/1998 | Ozaki | ............... | F25B 41/04 62/228.1 |
| 6,089,034 A | 7/2000 | Lake et al. | | |
| 8,424,326 B2 * | 4/2013 | Mitra | ............... | F25B 1/10 62/196.1 |
| 8,517,087 B2 | 8/2013 | Zeigler et al. | | |
| 8,899,062 B2 | 12/2014 | Kadle et al. | | |
| 9,233,592 B2 | 1/2016 | Larson | | |
| 9,533,546 B2 | 1/2017 | Cheng | | |
| 9,533,547 B2 | 1/2017 | Cheng | | |
| 9,764,620 B2 | 9/2017 | Liu et al. | | |
| 9,879,891 B2 | 1/2018 | Kowsky et al. | | |
| 10,046,617 B2 | 8/2018 | Smith et al. | | |
| 2004/0211199 A1 * | 10/2004 | Ozaki | ............... | F25B 41/00 62/170 |
| 2006/0117791 A1 * | 6/2006 | Suzuki | ............... | F25B 45/00 62/512 |
| 2008/0104975 A1 * | 5/2008 | Gorbounov | ............... | F25B 43/006 62/117 |
| 2010/0132399 A1 * | 6/2010 | Mitra | ............... | B60H 1/3228 62/498 |
| 2012/0227427 A1 * | 9/2012 | Liu | ............... | F25B 49/005 62/115 |
| 2013/0098092 A1 * | 4/2013 | Wakamoto | ............... | F25B 47/025 62/278 |
| 2015/0151609 A1 * | 6/2015 | Satou | ............... | B60H 1/3223 165/63 |
| 2015/0176868 A1 * | 6/2015 | Kayano | ............... | F25B 1/06 62/324.6 |
| 2017/0267063 A1 | 9/2017 | Shan | | |
| 2017/0297407 A1 | 10/2017 | Shan | | |
| 2018/0201094 A1 | 7/2018 | Kawano et al. | | |
| 2018/0222287 A1 | 8/2018 | Mieda et al. | | |

\* cited by examiner

VAPOR INJECTION HEAT PUMP AND CONTROL METHOD

TECHNICAL FIELD

This document relates generally to heat pumps, and more specifically to vapor injection heat pumps.

BACKGROUND

Driven by direct and indirect legislations, electrification will be required for compliance in the future automotive world. For hybrid and electric vehicles, heat pump systems represent a proven solution to extend the driving range of electrified vehicles and hold significant potential in meeting the increasing demands on electrification. Compared to heating methods using high voltage positive temperature coefficient (HV-PTC) heaters or phase-change material (PCM) heat storage, for example, a heat pump system may extend the driving range by up to 30% (FTP drive cycle at −10° C.; supplier data).

Since battery technological advances allow many electrified vehicles to routinely travel over 200 miles without recharging, the improvement to the driving range afforded in these vehicles through utilization of heat pump systems may not, alone, be sufficient to justify the use of these systems. This is particularly true given the fact that most electrified vehicles with heat pump systems are also equipped with HV-PTC heaters as a supplemental heating source in low ambient conditions (e.g., an ambient temperature below approximately a minus seven degrees Celsius (−7° C.). When combined with the required valves, controls, and expansion valve(s) required to make the system operate, the overall cost of heat pump systems can be greater than desired.

For plug-in hybrid electric vehicles where engine heating is available, some organizations have attempted to eliminate the need for HV-PTC heaters and the like in low ambient conditions utilizing a vapor injection heat pump. However, the vapor injection feature or mode of operation is only activated in a heating mode of operation. In order to overcome these issues, a need exists for such a vapor injection heat pump system that is capable of activation in more modes of operation than just a heating mode (e.g., a cooling mode of operation). Such a design would take full benefits of vapor injection and address degradation performance issues in both high and low ambient conditions, making it a more competitive solution for use in vehicle climate control and thermal management.

SUMMARY OF THE INVENTION

In accordance with the purposes and benefits described herein, a vapor injection heat pump is provided. The heat pump may be broadly described as comprising a compressor for compressing a refrigerant; a first heat exchanger receiving the refrigerant output by the compressor; a first expansion valve receiving the refrigerant output by the first heat exchanger and (1) directing the refrigerant to a first separator valve or (2) expanding the refrigerant into a first liquid and vapor refrigerant mix output to the first separator valve dependent upon a mode of operation, the first separator valve receiving the refrigerant or the first liquid and vapor refrigerant mix output by the first expansion valve and (1) directing the refrigerant to a second heat exchanger or (2) separating a vapor component of the first liquid and vapor refrigerant mix and injecting the separated vapor component into a second port of the compressor and directing a liquid component of the first liquid and vapor refrigerant mix to an orifice of the first separator valve and expanding the liquid component into a second liquid and vapor refrigerant mix and directing the second liquid and vapor refrigerant mix to the second heat exchanger dependent upon the mode of operation; a valve positioned between the second heat exchanger and a first port of the compressor allowing refrigerant output by the second heat exchanger to flow to the first port of the compressor or a second expansion valve dependent upon the mode of operation, the second expansion valve receiving the refrigerant output by the second heat exchanger and (1) directing the refrigerant to a second separator valve or (2) expanding the refrigerant into a third liquid and vapor refrigerant mix output to the second separator valve dependent upon a mode of operation, the second separator valve receiving the refrigerant or the third liquid and vapor refrigerant mix output by the second expansion valve and (1) directing the refrigerant to a third heat exchanger or (2) separating a vapor component of the third liquid and vapor refrigerant mix and injecting the separated vapor component into the second port of the compressor and directing a liquid component of the third liquid and vapor refrigerant mix to an orifice of the second separator valve which expands the liquid component into a fourth liquid and vapor refrigerant mix and directing the fourth liquid and vapor refrigerant mix to the third heat exchanger dependent upon the mode of operation; and a control module for controlling at least the valve, the first and second expansion valves, and the first and second separator valves dependent upon the mode of operation.

In another possible embodiment, the vapor injection heat pump further includes an accumulator receiving refrigerant output by the second heat exchanger or the third heat exchanger dependent upon the mode of operation and directing a vapor component of the refrigerant output by the second heat exchanger or the third heat exchanger to the first port of the compressor.

In yet another possible embodiment, the vapor injection heat pump further includes a check valve between the second separator valve and the second port of the compressor to prevent backflow into the second separator valve.

In one other possible embodiment, the first heat exchanger is a refrigerant-to-coolant heat exchanger and the second and third heat exchangers are air-to-refrigerant heat exchangers.

In still another possible embodiment, the vapor injection heat pump further includes a coolant loop including the first heat exchanger and a fourth heat exchanger through which a coolant is pumped dependent upon the mode of operation.

In yet another possible embodiment, the vapor injection heat pump further includes a refrigerant loop including the compressor, the first and second expansion valves, the first and second separator valves, the second heat exchanger, and the third heat exchanger.

In another possible embodiment, the vapor injection heat pumps described above are incorporated in a vehicle.

In one other possible embodiment, the refrigerant output by the compressor flows through the first heat exchanger, the first expansion valve, and the first separator valve with minimal, if any, thermal interaction, in first and second cooling modes of operation.

In yet still another possible embodiment, the second expansion valve expands the refrigerant output by the second heat exchanger into the third liquid and vapor refrigerant mix and the second separator valve separates the vapor component of the third liquid and vapor refrigerant mix output by the second expansion valve and injects the separated vapor component into the second port of the compressor and directs the liquid component of the third liquid and vapor refrigerant mix output by the second expansion valve to the orifice of the second separator valve which expands the liquid component into the fourth liquid and vapor refrigerant mix and directs the fourth liquid and vapor refrigerant mix to the third heat exchanger in the first cooling mode of operation.

In still another possible embodiment, the second expansion valve expands the refrigerant output by the second heat exchanger and the second separator valve directs the entire expanded refrigerant output by the second heat exchanger to the third heat exchanger in the second cooling mode of operation.

In another possible embodiment, the vapor injection heat pump further includes a coolant loop including the first heat exchanger and a fourth heat exchanger through which a coolant is pumped dependent upon the mode of operation.

In yet another possible embodiment, the refrigerant output by the second heat exchanger flows through the valve to the accumulator in first and second heating modes of operation.

In still yet another possible embodiment, the first expansion valve expands the refrigerant output by the first heat exchanger into the first liquid and vapor refrigerant mix and the first separator valve separates the vapor component of the first liquid and vapor refrigerant mix output by the first expansion valve and injects the separated vapor component into the second port of the compressor and directs the liquid component of the first liquid and vapor refrigerant mix output by the first expansion valve to the orifice of the first separator valve and expands the liquid component into the second liquid and vapor refrigerant mix and directs the second liquid and vapor refrigerant mix to the second heat exchanger in the first heating mode of operation.

In still another possible embodiment, the first expansion valve expands the refrigerant output by the first heat exchanger and the first separator valve directs the entire expanded refrigerant output by the first heat exchanger to the second heat exchanger in the second heating mode of operation.

In accordance with another aspect, a method of heating and cooling a vehicle utilizing a vapor injection heat pump is provided. The method may be broadly described as comprising the steps of: (a) compressing a refrigerant; (b) receiving the refrigerant output by the compressor in a first heat exchanger; (c) receiving the refrigerant output by the first heat exchanger in a first expansion valve and (1) directing the refrigerant to a first separator valve or (2) expanding the refrigerant into a first liquid and vapor refrigerant mix output to the first separator valve dependent upon the mode of operation; (d) receiving the refrigerant or first liquid and vapor refrigerant mix output by the first expansion valve in the first separator valve and (1) directing the refrigerant to a second heat exchanger or (2) separating a vapor component of the first liquid and vapor refrigerant mix and injecting the separated vapor component into a second port of the compressor and directing a liquid component of the first liquid and vapor refrigerant mix to an orifice of the first separator valve and expanding the liquid component into a second liquid and vapor refrigerant mix and directing the second liquid and vapor refrigerant mix to the second heat exchanger dependent upon the mode of operation; (e) directing the flow of refrigerant output by the second heat exchanger using a valve positioned between the second heat exchanger and a first port of the compressor to the first port of the compressor or a second expansion valve dependent upon the mode of operation; (f) receiving the refrigerant output by the second heat exchanger in a second expansion valve and (1) directing the refrigerant to a second separator valve or (2) expanding the refrigerant output by the second heat exchanger into a third liquid and vapor refrigerant mix output to the second separator valve dependent upon the mode of operation; (g) receiving the refrigerant or third liquid and vapor refrigerant mix output by the second expansion valve in the second separator valve and (1) directing the refrigerant to a third heat exchanger or (2) separating a vapor component of the third liquid and vapor refrigerant mix output by the second expansion valve and injecting the separated vapor component into the second port of the compressor and directing a liquid component of the third liquid and vapor refrigerant mix output by the second expansion valve to an orifice of the second separator valve and expanding the liquid component into a fourth liquid and vapor refrigerant mix and directing the fourth liquid and vapor refrigerant mix to the third heat exchanger dependent upon the mode of operation; and (h) controlling at least the valve, the first and second expansion valves, and the first and second separator valves dependent upon the mode of operation.

In another possible embodiment, the refrigerant output by the compressor flows through the first heat exchanger, the first expansion valve, and the first separator valve with minimal, if any, thermal interaction, in first and second cooling modes of operation.

In yet another possible embodiment, the second expansion valve expands the refrigerant output by the second heat exchanger into the third liquid and vapor refrigerant mix and the second separator valve separates a vapor component of the third liquid and vapor refrigerant mix output by the second expansion valve and injects the separated vapor component into the second port of the compressor and directs a liquid component of the third liquid and vapor refrigerant mix output by the second expansion valve to the orifice of the second separator valve and expands the liquid component into the fourth liquid and vapor refrigerant mix and directs the fourth liquid and vapor refrigerant mix to the third heat exchanger in the first cooling mode of operation.

In still another possible embodiment, the second expansion valve expands the refrigerant output by the second heat exchanger and the second separator valve directs the entire expanded refrigerant output by the second heat exchanger to the third heat exchanger in the second cooling mode of operation.

In accordance with one additional aspect a vapor injection heat pump includes a compressor for compressing a refrigerant, the compressor having first and second suction ports; a first heat exchanger, a first expansion valve, and a first separator valve receiving the refrigerant output from the compressor and each allowing the refrigerant to flow through with minimal, if any, thermal interaction, to a second heat exchanger, in first and second cooling modes of operation; a second expansion valve expanding the refrigerant output by the second heat exchanger into a liquid and vapor refrigerant mix; a second separator valve for separating a vapor component of the liquid and vapor refrigerant mix output by the second expansion valve and injecting the separated vapor component into the second suction port of the compressor and directing a remaining component of the liquid and vapor refrigerant mix output by the second expansion valve to an orifice of the second separator valve and expanding the remaining component into a second liquid and vapor refrigerant mix and directing the second liquid and vapor refrigerant mix to a third heat exchanger in a first cooling mode of operation, or directing the expanded refrigerant output by the second heat exchanger to the third heat exchanger in the second cooling mode of operation; and a control module for controlling at least the first and second expansion valves, and the first and second separator valves dependent upon the mode of operation.

In another possible embodiment, the vapor injection heat pump further includes a coolant loop including a refrigerant-to-coolant heat exchanger and an air-to-coolant heat exchanger through which a coolant is pumped dependent upon the mode of operation.

In yet another possible embodiment, the vapor injection heat pump utilizes a refrigerant-to-air heat exchanger positioned within the HVAC case of the vehicle.

In still another possible embodiment, the refrigerant output by the second heat exchanger flows through a valve to an accumulator in first and second heating modes of operation.

In the following description, there are shown and described several embodiments of a vapor injection heat pump and related methods of heating and cooling a passenger compartment of a vehicle. As it should be realized, the methods and vapor injection heat pumps are capable of other, different embodiments and their several details are capable of modification in various, obvious aspects all without departing from the methods and vapor injection heat pumps as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vapor injection heat pump and related methods and together with the description serve to explain certain principles thereof. In the drawing figures.

Reference will now be made in detail to the present embodiments of the vapor injection heat pump and related methods of heating and cooling a passenger compartment, examples of which are illustrated in the accompanying drawing figures, wherein like numerals are used to represent like elements.

DETAILED DESCRIPTION

Figure 1:
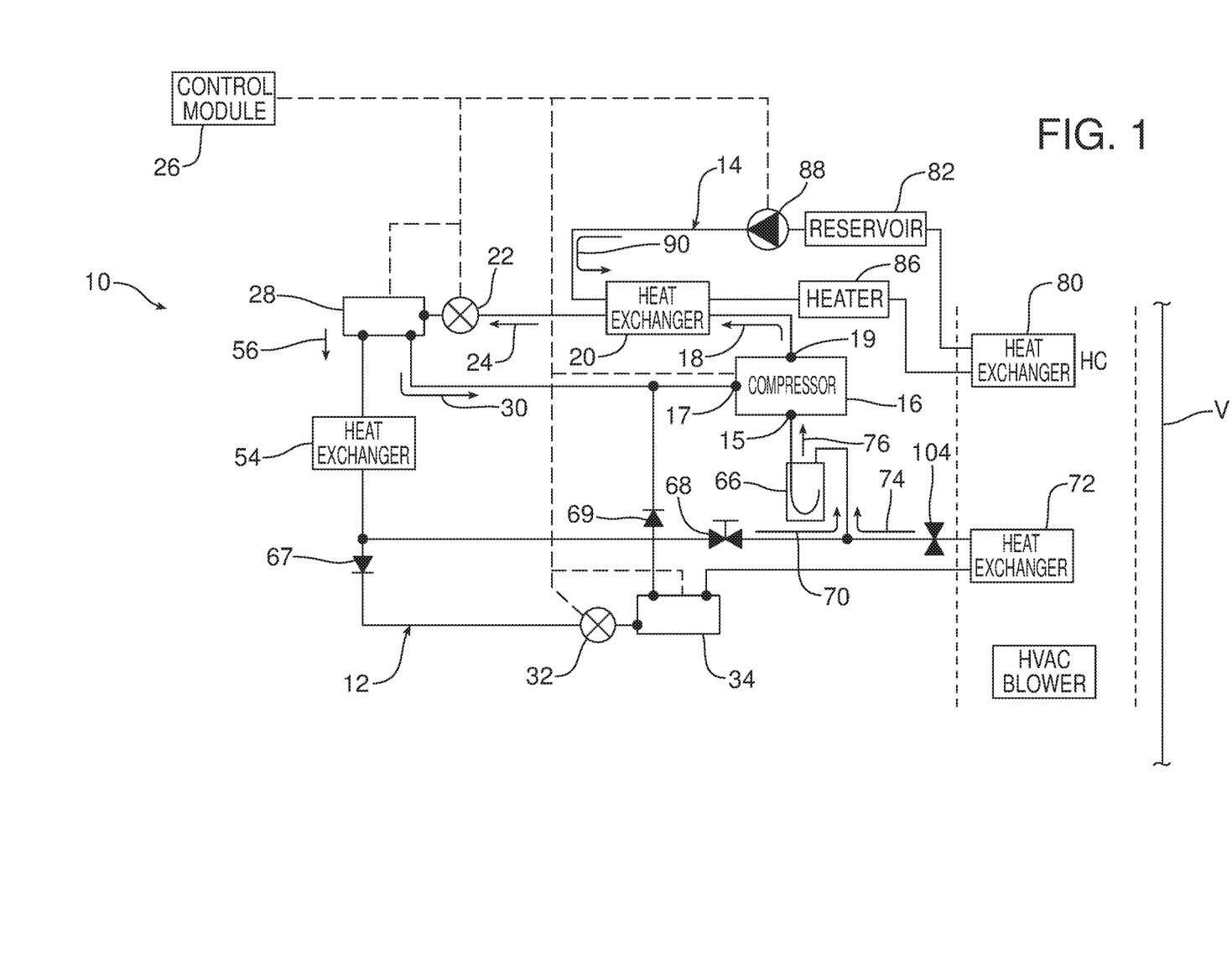
FIG. 1 is a schematic diagram of a vapor injection heat pump having a primary or refrigerant loop and a secondary or coolant loop.

Reference is now made to FIG. 1 which illustrates a schematic diagram of a vapor injection heat pump 10 for a vehicle (V) including a primary loop 12 and a secondary loop 14. While the vapor injection heat pump 10 is operable in any vehicle type, it is considered most suitable for hybrid and electric vehicles and is capable of operating in heating or cooling modes of operation among others. Within the primary or refrigerant loop 12, a fluid (e.g., an R744, R134a, or R1234yf refrigerant) in the form of a gas or vapor refrigerant enters first and/or second suction ports of a compressor 16. Within the compressor 16, refrigerant entering the first suction port 15 is compressed from a low-pressure stage. The compressed refrigerant may be combined with refrigerant entering the second suction port 17, in a vapor injection mode, and the combined refrigerants are compressed from intermediate-pressure gas refrigerant into a high-pressure, high-temperature vapor refrigerant and released from a discharge port 19.

The high temperature, high pressure vapor refrigerant leaves the compressor 16 via the discharge port 19 as shown by action arrow 18, and flows through a first, refrigerant-to-coolant, heat exchanger 20 to a first expansion valve 22 as shown by action arrow 24. In the described embodiment, the first expansion valve 22 has three operating modes controlled by a control module 26 which is electrically connected to the first expansion valve (as shown by dashed line). The three operating modes include an open mode providing minimal flow restriction, a closed mode blocking refrigerant flow, and an intermediate open mode causing a certain degree of expansion of the refrigerant. The mode of operation of the first expansion valve 22 is dependent upon a mode of operation of the vapor injection heat pump 10.

When the vapor injection heat pump 10 is operating in a heating mode, the first expansion valve 22 is operating in the intermediate or expansion mode wherein a high-pressure refrigerant from the refrigerant-to-coolant heat exchanger 20 is expanded to become a low-pressure, low-temperature liquid and vapor refrigerant mixture. Regardless of the operating mode of the first expansion device 22, the refrigerant passing therefrom is supplied to a first separator valve 28. Depending upon the mode of operation, the first separator valve 28 either allows the liquid and vapor refrigerant mixture to simply pass through the valve, generally unaffected, or the valve acts to direct, or inject, a vapor component of the liquid and vapor refrigerant mix to the second suction port 17 (or intermediate-pressure input port) of the compressor 16 as generally shown by action arrow 30 in FIG. 1. This is referred to as the vapor injection mode of operation.

In the described embodiment, the first expansion valve 22 and a second expansion valve 32, shown in FIG. 1, are each electronic expansion valves with adjustable opening sizes. However, similar functions can be achieved using a fixed orifice tube, or a thermal expansion device, combined with extra valves (not shown) in alternate embodiments. When the expansion valves 22 and 32 are electronic expansion valves having openings therein through which the refrigerant passes, regulation of the flow of refrigerant, or throttling, is used to control a temperature of the output refrigerant. In this instance, the output refrigerant is received by the first separator valve 28 and a second separator valve 34 respectively. Increasing the pressure drop necessarily lowers the temperature of the output refrigerant entering the first or second separator valves 28, 34. The size of the opening within the expansion valves 22, 32 which determines refrigerant status moving through the valves is controlled by the control module 26 which is electrically connected to the first and second expansion valves 22, 32 as shown by dashed line.

In a similar manner, the first separator valve 28 and a second separator valve 34 are controlled by the control module 26 which is electrically connected to the separator valves (as shown by dashed line). Given the similar nature of operation of the first and second separator valves, the following description of the first separator valve 28 and its operation will apply to both separator valves.

Figure 2:
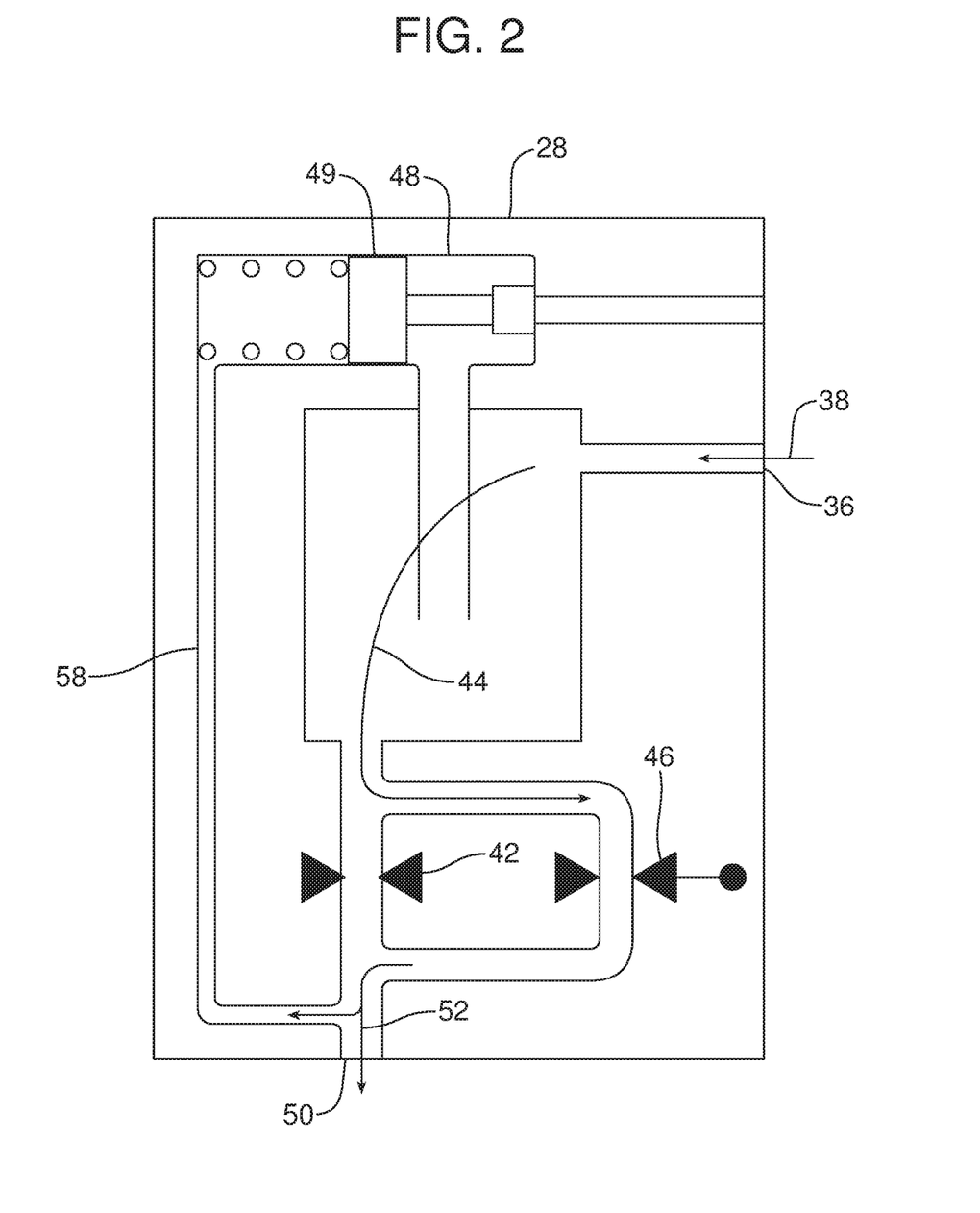
FIG. 2 is a cross-sectional view of a separator valve shown operating in a pass-through mode of operation in the vapor injection heat pump.

As shown in FIG. 2, the separator valve 28 includes an inlet port 36 through which refrigerant from the first expansion device 22 is received, as shown by action arrow 38. In a pass-through mode of operation, the refrigerant flow passes through the first separator valve 28 without the valve actively separating the refrigerant into gaseous and liquid components. More specifically, a magnetic valve 46 is in an open position in the pass-through mode. An orifice 42, within the separator valve 28 and configured parallel to the magnetic valve 46, has a smaller size than the magnetic valve 46 in the open position and a much higher flow resistance. As a result, a majority, if not all, of the refrigerant entering inlet port 36 and a separator chamber 40 passes through the magnetic valve 46, as shown by action arrow 44. Due to an insufficient pressure differential on opposing sides of a moveable component 49, such as a plunger, a spring force in a differential pressure regulating valve 48 biases or maintains the plunger in a closed position in the pass-through mode which prohibits flow through a second outlet port 62. The entire refrigerant flow entering the inlet port 36 thus exits through a first outlet port 50 as shown by action arrow 52. Returning to FIG. 1, the refrigerant flow exiting the first separator valve 28 via outlet port 50 flows to a second, air-to-refrigerant, heat exchanger 54, as shown by action arrow 56.

Figure 3:
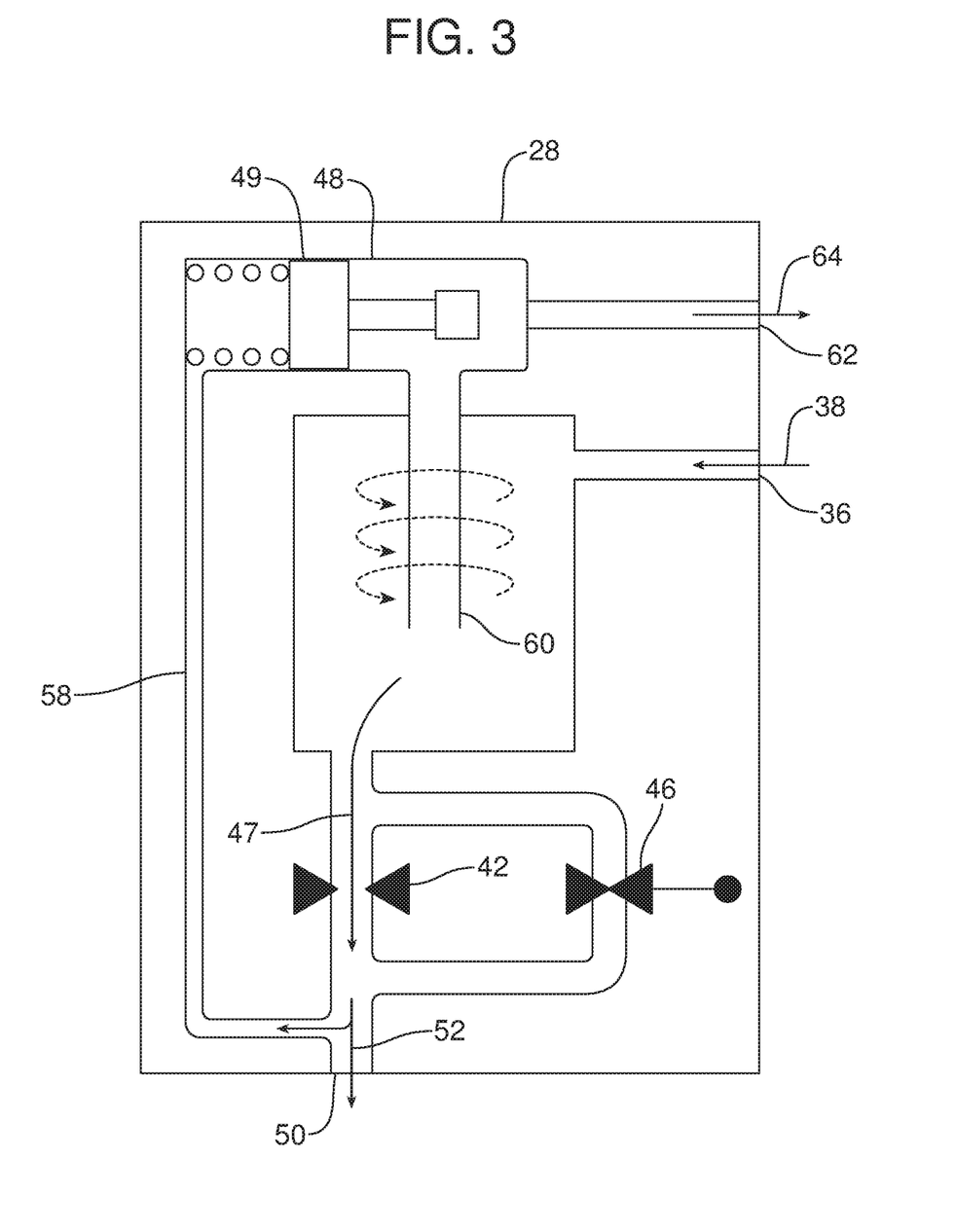
FIG. 3 is a cross-sectional view of a separator valve shown operating in a vapor injection mode of operation in the vapor injection heat pump.

In the vapor injection mode of operation, shown in FIG. 3, the refrigerant flow in a state of liquid and vapor refrigerant mix similarly enters the first separator valve 28 via inlet port 36. In this mode, however, the magnetic valve 46 is energized to a closed position forcing the liquid and vapor refrigerant mix through the orifice 42 (shown by action arrow 47). The refrigerant passing through the orifice 42 is expanded lowering the pressure and the temperature thereof. The size of the opening of the orifice 42 determines the pressure (or temperature) of the refrigerant as is known in the art. Due to the expansion, the left side of the moveable component 49 (as shown in FIG. 3), which is in hydraulic contact with the outlet of the orifice 42 through conduit 58, now has a lower pressure than the right side of the moveable component 49, which is in hydraulic contact with the inlet of the separator valve 28 through conduit 60.

This pressure differential is sufficient to overcome the spring bias designed to maintain the regulating valve 48 in a closed position and move the moveable component 49, such as a plunger, within the regulating valve to an open position. This allows a vapor component separated from the liquid and vapor refrigerant mix via the separator chamber 40 to exit through the second outlet port 62, as shown by action arrow 64. One such exemplary separator valve is described in U.S. Pat. No. 9,109,823. The separated vapor component exiting the second output port 62 is directed to the second suction port 17 (or intermediate-pressure input port or injection port) of the compressor 16 as generally shown by action arrow 30 in FIG. 1. The remaining liquid component passes through the orifice 42 and is expanded to another liquid and vapor refrigerant mix with lower pressure and temperature. The new low-temperature, low-pressure liquid and vapor refrigerant mix exits the first separator valve 28 via outlet port 50 and flows to the second, air-to-refrigerant, heat exchanger 54 as shown by action arrow 56. It should be noted, however, that while referred to as a liquid component, the liquid component may be a liquid and vapor refrigerant mix as the separation in the separator chamber 40 may not be perfect.

Dependent upon the mode of operation, the second heat exchanger 54 functions as a condenser or an evaporator as will be described in detail below. The refrigerant flow exiting the second heat exchanger 54 is received directly by an accumulator 66 via a shutoff valve 68 (shown by action arrow 70) or indirectly, via the second expansion valve 32, the second separator valve 34, and a third heat exchanger 72 (shown by action arrow 74) dependent upon the mode of operation. In all but deicing modes of operation in the described embodiment, the accumulator 66 receives low-pressure, low-temperature, mostly vapor, refrigerant exiting either the second or third heat exchangers 54, 72.

As is generally known, the accumulator 66 functions to store excessive refrigerant and provide only vapor refrigerant to the compressor 16. In the described embodiment, the accumulator 66 provides vapor refrigerant to the first suction port (or low-pressure input port) of the compressor 16 as shown by action arrow 76. As described above, the refrigerant entering the first suction port is compressed in the low-pressure stage, combined with the refrigerant entering the second suction port in the vapor injection mode of operation, and compressed in the intermediate-pressure stage into the high-pressure, high-temperature gas refrigerant.

As further shown in FIG. 1, the control module 26 is electrically connected to components within the vapor injection heat pump 10 (as shown by dashed lines) in addition to the first expansion valve 22 and the first separator valve 28. One such component is the compressor 16. In the described embodiment, the compressor 16 is an electric, multi-port compressor driven by a variable speed motor (not shown) and the control module 26 adjusts a speed of the motor. Other embodiments may utilize fixed or variable displacement compressors driven by a compressor clutch which in turn is driven by an engine of the vehicle.

Other components connected to the control module 26, in the described embodiment, include each of the valves, expansion valves, and separator valves, whether or not connected to the control module by dashed lines in the present figures. While the described embodiment utilizes a single control module 26 to control the plurality of components within the vapor injection heat pump 10, any of a plurality of control modules, controllers, or the like connected to a vehicle computer via a controller area network (CAN) bus or a local interconnect network (LIN) in the vehicle, as is known in the art, could be utilized to control one or more of the plurality of components of the vapor injection heat pump 10. The control module 26 is responsive to varying inputs (e.g., a switch or other input means) operated by an operator of the vehicle (V), or automated, in the described embodiment. The switch (e.g., an air conditioning on/off switch) changes a mode of operation from, for example, a cooling mode to an off mode, a heating mode, or other modes of operation. Similarly, a temperature sensor sensing an ambient condition of the vehicle (V) may provide input sufficient to trigger a change in operating mode of the vapor injection heat pump 10.

As eluded to above, the refrigerant loop 12 interacts with the secondary or coolant loop 14 primarily through heat transfers occurring within the first refrigerant-to-coolant heat exchanger 20. Within the coolant loop 14, control module 26 controls coolant flows through a fourth, air-to-coolant, heat exchanger 80, a reservoir 82 (e.g., a degas tank), the first refrigerant-to-coolant heat exchanger 20, and a heater 86 (e.g., a positive temperature coefficient (PTC) heater) dependent upon the mode of operation of the vapor injection heat pump 10. As shown in FIG. 1, a pump 88 pumps the coolant through the coolant loop 14, as shown by action arrow 90. The control module 26 controls the pump 88 and necessarily a rate of coolant flow dependent upon the mode of operation and a desired output. It should be noted that the pump 88 may be turned off in certain modes of operation which are described below.

Figure 4:
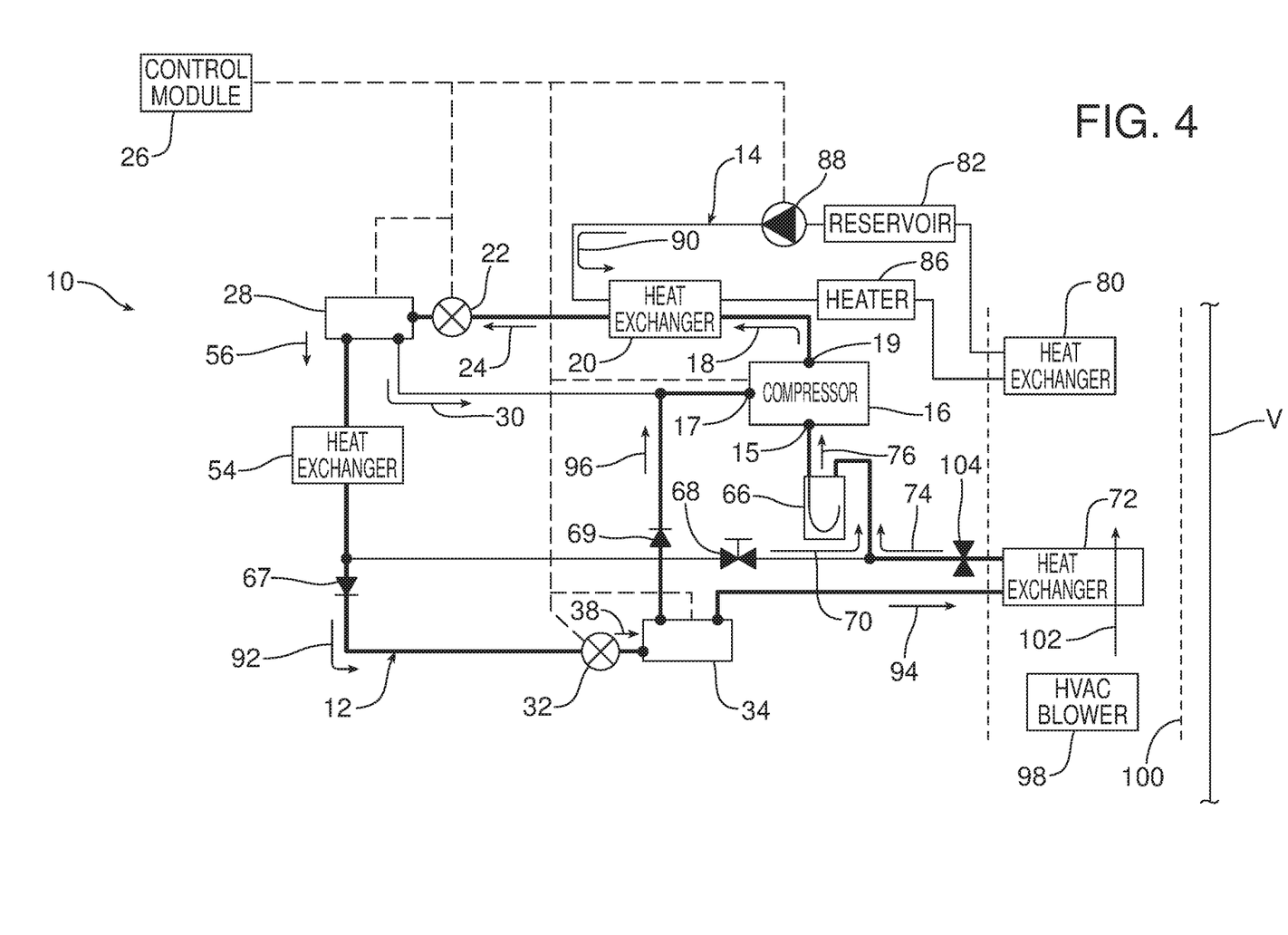
FIG. 4 is a schematic diagram of the vapor injection heat pump operating in a cooling mode.

In a cooling mode of operation, as shown in FIG. 4, the high temperature, high pressure vapor refrigerant leaves the compressor 16 via a discharge port 19, as shown by action arrow 18, and flows through the refrigerant-to-coolant heat exchanger 20 to the first expansion valve 22. The control module 26 signals the first expansion valve 22 and the first separator valve 28 to direct the flow of the refrigerant to the second, air-to-refrigerant, heat exchanger 54 as shown by action arrow 56. In this mode of operation, the refrigerant-to-coolant heat exchanger 20 and coolant loop 14 are idle, the first expansion valve 22 and the first separator valve 28 are open essentially allowing the refrigerant to pass through unaffected, and the first air-to-refrigerant heat exchanger 54 functions as a condenser (or gas cooler). Said another way, the refrigerant may flow through the first expansion valve 22 and the first separator valve 28 in a manner such that neither actively adjusts or otherwise modifies the temperature and/or pressure of the refrigerant. It is contemplated that, while one or more of the valves may not actively modify the temperature and/or pressure of the refrigerant, some amount of passive modification of the temperature and/or pressure of the refrigerant may occur due to, for example, differences in temperature between the refrigerant and these components, parasitic losses within the refrigerant loop 12, and the like.

Within the second, air-to-refrigerant, heat exchanger 54, the high-pressure, high-temperature vapor refrigerant discharged from the compressor 16 changes temperature due primarily to the effect of outside air. A fan (not shown) may be utilized to create and regulate a flow of air over the second, air-to-refrigerant, heat exchanger 54 and a radiator. The high-pressure refrigerant is then directed through check valve 67 (shown by action arrow 92), used in certain embodiments, to the second expansion valve 32. The check valve 67 can prevent backflow of the refrigerant acting as a unidirectional valve that permits flow of the refrigerant in one direction only and may not be utilized in all embodiments. In the second expansion valve 32, the high-pressure refrigerant is expanded to become an intermediate-pressure, intermediate-temperature liquid and vapor refrigerant mixture and supplied to the second separator valve 34.

Dependent upon ambient conditions of the vehicle (V), the control module 28 determines whether the second separator valve 34 operates in a pass-through mode or a vapor injection mode. In certain high ambient conditions, utilizing vapor injection is shown to significantly increase the cooling capacity of the system 10 which improves passenger compartment comfort and extends the driving range of the vehicle (V). Improvement by the vapor injection mode may be reduced in milder ambient conditions (e.g., below twenty-five degrees Celsius (25° C.)) and thus either mode may be utilized under such conditions in the described embodiment.

Since the first and second separator valves 28, 34 have the same configuration except for their location within the vapor injection heat pump 10 and reference numerals (some parameters, for example the orifice size and spring constant, may be different between the separator valves), we will refer to the separator valve 28 shown in FIGS. 2 and 3 as separator valve 34 throughout the immediately following description. In other words, reference will be made to separator valve 34 in FIGS. 2 and 3 which is labeled 28.

As shown in FIG. 2, the separator valve 34 includes an inlet port 36 through which refrigerant from the second expansion device 32 is received, as shown by action arrow 38. In the pass-through mode of operation, the refrigerant passes through the second separator valve 34 without the valve actively separating the refrigerant into gaseous and liquid components. More specifically, the magnetic valve 46 is set in an open position in the pass-through mode. The orifice 42, within the separator valve 28 and configured parallel to the magnetic valve 46, has a smaller size than the magnetic valve 46 in the open position and hence much higher flow resistance. The majority, if not all, of the refrigerant entering the inlet port 36 and a separator chamber 40 then passes through the magnetic valve 42, as shown by action arrow 44. Due to an insufficient pressure differential on the left and right sides of the moveable component 49, the spring force in the pressure regulating valve 48 biases or puts it in a closed position in the pass-through mode and prohibits flow through a second outlet port 62. The entire refrigerant flow entering the inlet port 36 now exits through the outlet port 50 as shown by action arrow 52. Returning to FIG. 4, the refrigerant flow exiting the second separator valve 34 via outlet port 50 flows to a third air-to-refrigerant heat exchanger 72, as shown by action arrow 94.

In the vapor injection mode of operation, shown in FIG. 3, the refrigerant flow in a state of liquid and vapor refrigerant mixture enters the separator valve 34 via inlet port 36. In this mode, however, the magnetic valve 46 is energized to the closed position forcing the liquid and vapor refrigerant mix through the orifice 42 (shown by action arrow 47). The refrigerant passing through the orifice 46 is expanded lowering the pressure and the temperature thereof. The size of the opening of the orifice 46 determines the pressure (or temperature) of the refrigerant as is known in the art. Due to the expansion, the left side of the moveable component 49, which is in hydraulic contact with the outlet of the orifice 42 through conduit 58, now has a lower pressure than the right side of the moveable component 49, which is in hydraulic contact with the inlet of the separator valve 28 through conduit 60.

This pressure differential is sufficient to overcome the spring bias designed to maintain the regulating valve 48 in a closed position and move the moveable component 49 within the regulating valve to an open position. This allows a vapor component separated from the liquid and vapor refrigerant mix via the separator chamber 40 to exit through the second outlet port 62, shown by action arrow 64, and flow to the second suction port 17 (or intermediate-pressure input port or injection port) of the compressor 16 as generally shown by action arrow 96 in FIG. 4. The remaining liquid component passes through the orifice 42 and is expanded to another liquid and vapor refrigerant mix with lower pressure and temperature. The new low-temperature, low-pressure liquid and vapor refrigerant mix exits the second separator valve 34 via outlet port 50 and flows to the third air-to-refrigerant heat exchanger 72, as shown by action arrow 94. Again, it should be noted that while referred to as a liquid component, the liquid component may be a liquid and vapor refrigerant mix as the separation in the separator chamber 40 may not be perfect.

In the cooling mode, the third air-to-refrigerant heat exchanger 72 functions as an evaporator as is known in the art. In the described embodiment, the third air-to-refrigerant heat exchanger 72 is positioned within a heating, ventilation, and air conditioning (HVAC) case 100 of the vehicle (V) and used to cool or dehumidify a passenger compartment (not shown).

Warm, moist air flowing across the third air-to-refrigerant heat exchanger 72 (as shown by arrow 102) transfers its heat to the cooler refrigerant within the third air-to-refrigerant heat exchanger. The byproducts are a lowered temperature air and condensation from the air which is routed from the third air-to-refrigerant heat exchanger 72 to an exterior of the vehicle (V). A blower 98 may blow air across the third air-to-refrigerant heat exchanger 72. This process results in the passenger compartment having a cooler, drier air therein.

Within the third air-to-refrigerant heat exchanger 72, the low-pressure, low-temperature liquid and vapor refrigerant mixture boils to a vapor, or mostly vapor (with some liquid), state due to the heat removed from the air. The resulting low-pressure, low-temperature refrigerant exits the third air-to-refrigerant heat exchanger 72 and flows toward the accumulator 66, as shown by action arrow 74.

In the described embodiment, a pressure regulating valve 104 may or may not be utilized to monitor or control a state or phase of the refrigerant in the third air-to-refrigerant heat exchanger 72. For example, if utilized, the pressure regulating valve 104 can be fully open when the refrigerant in the third air-to-refrigerant heat exchanger 72 is above a freezing point of the moisture in the air. As the refrigerant in third air-to-refrigerant heat exchanger 72 approaches the freezing point of the moisture, the pressure regulating valve 104 begins to close and may be fully closed once the moisture starts to freeze on the third air-to-refrigerant heat exchanger. With the pressure regulating valve 104 closed, the pressure and/or temperature of the refrigerant within third air-to-refrigerant heat exchanger 72 may increase such that temperature of the fin and tube of the third air-to-refrigerant heat exchanger exceeds the freezing point of the moisture. Accordingly, the pressure regulating valve 104 may begin to open and permit the refrigerant to enter the accumulator 66. Note that the pressure regulating valve 104 may have to be utilized in other embodiments.

Figure 5:
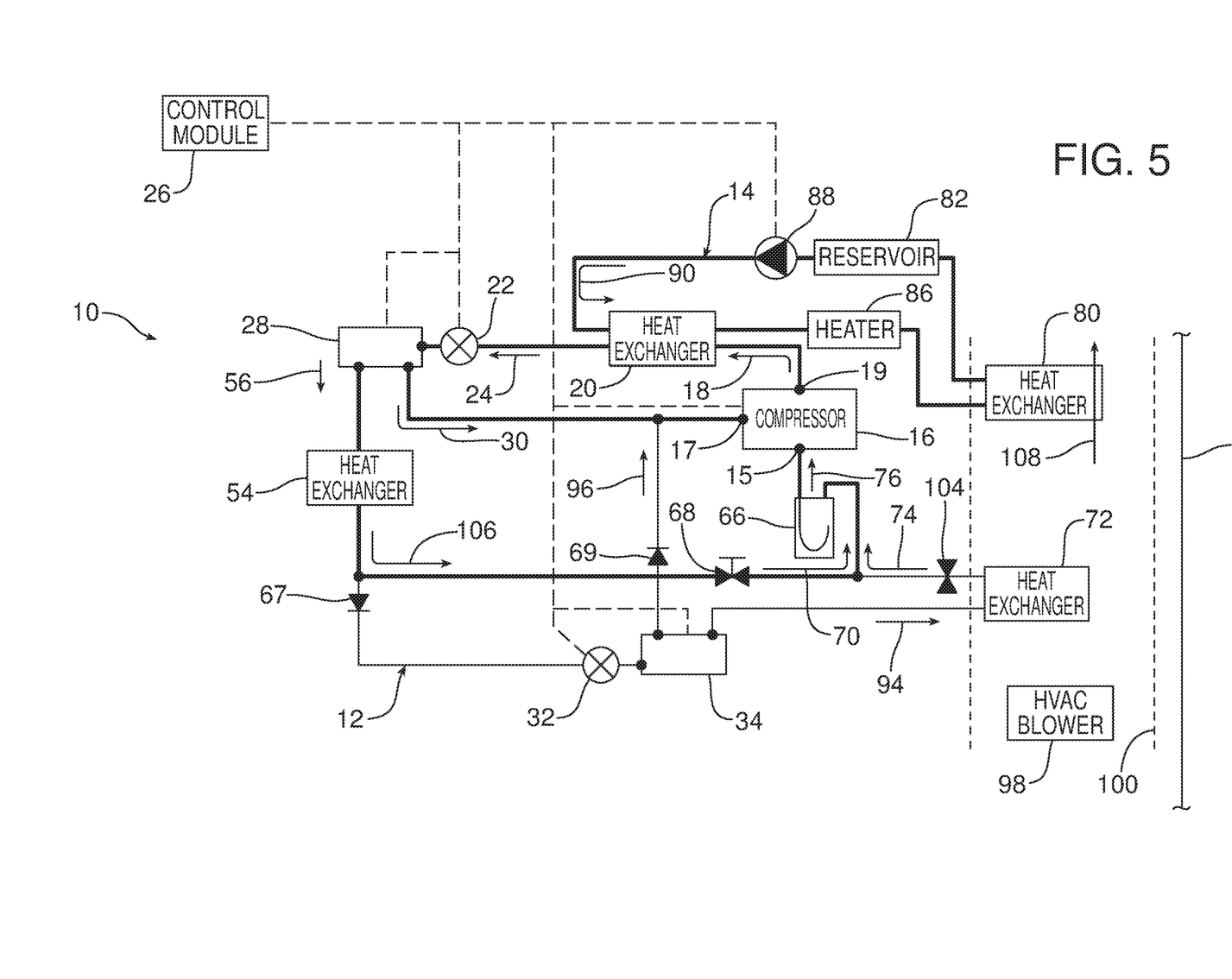
FIG. 5 is a schematic diagram of the vapor injection heat pump operating in a heating mode.

In a heating mode of operation, as shown in FIG. 5, the high temperature, high pressure vapor refrigerant leaves the compressor 16 via a discharge port 19 as shown by action arrow 18. The refrigerant-to-coolant heat exchanger 20 functions as described above to cool the high-pressure, high-temperature vapor refrigerant discharged from the compressor 16. The cooled, high-pressure refrigerant, most time in liquid state, then flows to the first expansion valve 22, as shown by action arrow 24, where the control module 26 signals the first expansion valve to expand the refrigerant into an intermediate-pressure, intermediate-temperature liquid and vapor refrigerant mixture which is supplied to the first separator valve 28.

As described in detail above with regard to utilization of the second separator valve 34 in the cooling mode, the control module 28 determines whether the first separator valve 28 operates in a pass-through mode or a vapor injection mode. In certain low ambient conditions, e.g., when an ambient temperature is below zero degrees Celsius (0° C.), utilizing vapor injection is shown to increase the heating capacity of the vapor injection heat pump 10 which improves passenger compartment comfort and extends the driving range of the vehicle (V). Improvement by the vapor injection mode may reduce in milder ambient conditions (e.g., above 0 degrees Celsius (0° C.)) and thus either mode may be utilized under such conditions in the described embodiment.

As shown in FIG. 2, the separator valve 28 includes an inlet port 36 through which refrigerant from the first expansion device 22 is received, as shown by action arrow 38. In the pass-through mode of operation, the refrigerant flow passes through the first separator valve 28 without the valve actively separating the refrigerant into gaseous and liquid components. More specifically, the magnetic valve 46 is set in an open position in the pass-through mode. The orifice 42, within the separator valve 28 and configured parallel to the magnetic valve 46, has a smaller size than the magnetic valve 46 in the open position and much higher flow resistance. The majority, if not all, of the refrigerant entering the inlet port 36 and the separator chamber 40 then passes through the magnetic valve 46, as shown by action arrow 44. Due to no sufficient pressure differential on the left and right sides of the moveable component 49, such as a plunger, the spring force in the differential pressure regulating valve 48 puts it in a closed position in the pass-through mode and prohibits flow through the second outlet port 62. The entire refrigerant flow entering the inlet port 36 now exits through the first outlet port 50 as shown by action arrow 52. Returning to FIG. 5, the refrigerant flow exiting the first separator valve 28 via outlet port 50 flows to the second, air-to-refrigerant, heat exchanger 54, as shown by action arrow 56.

In the vapor injection mode of operation, shown in FIG. 3, the refrigerant flow in a state of liquid and vapor refrigerant mix similarly enters the first separator valve 28 via inlet port 36. In this mode, however, the magnetic valve 46 is energized to the closed position forcing the liquid and vapor refrigerant mix through the orifice 42 (shown by action arrow 47). The refrigerant passing through the orifice 42 is expanded lowering the pressure and the temperature thereof. The size of the opening of the orifice 42 determines the pressure (or temperature) of the refrigerant as is known in the art. Due to the expansion, the left side of the moveable component 49, which is in hydraulic contact with the outlet of the orifice 42 through conduit 58, now has a lower pressure than the right side of the moveable component 49, which is in hydraulic contact with the inlet of the separator valve 28 through conduit 60.

This pressure differential is sufficient to overcome the spring bias designed to maintain the regulating valve 48 in a closed position and move the moveable component, such as a plunger, within the regulating valve to an open position. This allows a vapor component separated from the liquid and vapor refrigerant mix via the separator chamber 40 to exit through the second outlet port 62, shown by action arrow 64, and flow to the second suction port 17 (or intermediate-pressure input port or injection port) of the compressor 16 as generally shown by action arrow 30 in FIG. 5. Similar to the check valve 67, the check valve 69 acts as a unidirectional valve and prevents backflow of the refrigerant into the second separator. The remaining liquid component passes through the orifice 42 and is expanded to another liquid and vapor refrigerant mix with lower pressure and temperature. The new low-temperature, low-pressure liquid and vapor refrigerant mix exits the first separator valve 28 via outlet port 50 and flows to the second, air-to-refrigerant, heat exchanger 54, as shown by action arrow 56. Again, it should be noted that while referred to as a liquid component, the liquid component may be a liquid and vapor refrigerant mix as the separation in the separator chamber 40 may not be perfect.

In the heating mode, the second, air-to-refrigerant, heat exchanger 54 functions as an evaporator as is known in the art. In this instance, the low-temperature, low-pressure liquid and vapor refrigerant mix discharged from the first separator valve 28 boils to a vapor, or mostly vapor (with some liquid), state due to heat transferred from warm air flowing across the second air-to-refrigerant heat exchanger 54 to the cooler refrigerant within the second air-to-refrigerant heat exchanger. The low-pressure, low-temperature refrigerant in a vapor, or mostly vapor (with some liquid), state exits the second air-to-refrigerant heat exchanger 54, as shown by action arrow 106, and is directed to the accumulator 66 via the shutoff valve 68. As described above, the low-pressure, low-temperature vapor refrigerant flows from the accumulator 66 to the first suction port (or low-pressure input port) of the compressor 16. In this mode of operation of the vehicle (V), the low-pressure, low-temperature refrigerant exiting the second air-to-refrigerant heat exchanger 54 bypasses the second expansion valve 32 and the second separator valve 34.

In addition, the control module 26 directs the pump 88 to pump coolant within the coolant loop 14 through the refrigerant-to-coolant heat exchanger 20 and a fourth air-to-coolant heat exchanger 80 which functions as a heater core. As is known in the art, the fourth air-to-coolant heat exchanger 80 is positioned within the HVAC case 100 of the vehicle (V) and is used to warm the passenger compartment. Cold air flowing across the fourth air-to-coolant heat exchanger 80 (as shown by arrow 108) absorbs heat from the warm coolant thereby increasing the temperature of the air. The blower 98 blows air across the fourth air-to-coolant heat exchanger 80 and into the passenger compartment. This process results in the passenger compartment having a warmer air therein.

Within the fourth air-to-coolant heat exchanger 80, the warm coolant is cooled due to the heat given to the air and directed back to the refrigerant-to-coolant heat exchanger 20 (as shown by action arrow 90). In the first refrigerant-to-coolant heat exchanger 20, the cooled coolant is again warmed by absorbing heat from the refrigerant in the refrigerant loop 12 and cycled through the coolant loop 14.

As noted above, the control module 26 is electrically connected to the pump 88 and the compressor 16 and controls one or both in varying embodiments to adjust or regulate the heating capacity of the fourth air-to-coolant heat exchanger 80. Increasing the pumping rate raises the coolant flow rate in the coolant loop 14 and increasing the compressor speed raises the refrigerant flow rate in the refrigerant loop 12, thereby increasing heating capacity. The opposite is true when the pumping rate and/or the compressor speed is lowered and heating capacity is decreased.

The foregoing has been presented for purposes of illustration and description. It is not intended to be exhaustive or to limit the embodiments to the precise form disclosed. Obvious modifications and variations are possible in light of the above teachings. For example, a second shut-off valve could be added to the vapor injection heat pump 10 shown in FIG. 1 to allow for utilization of the heat pump in a parallel dehumidification mode.

Figure 6:
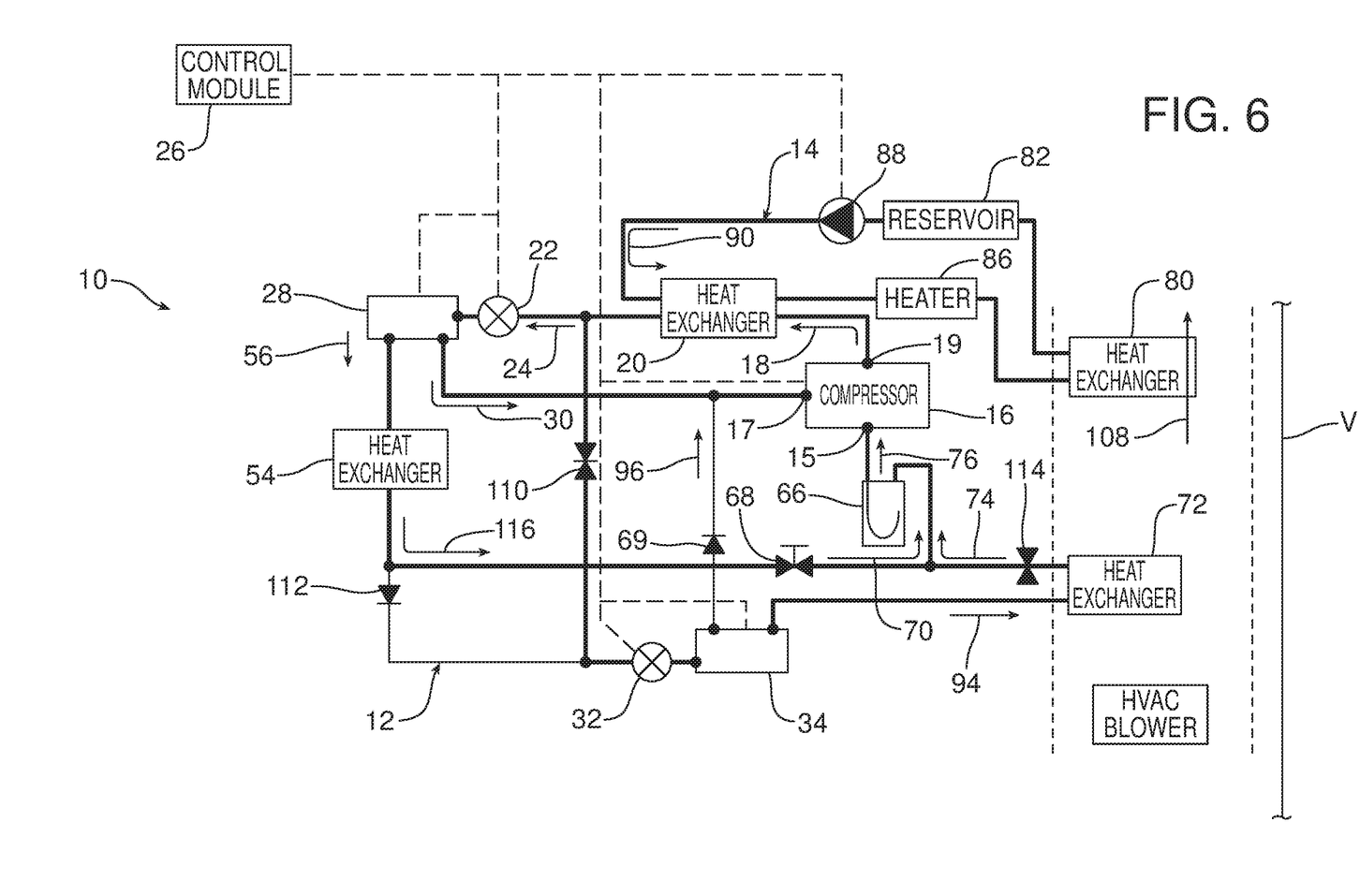
FIG. 6 is a schematic diagram of the vapor injection heat pump operating in a parallel dehumidification and re-heating mode.

In such an alternate embodiment shown in FIG. 6, the second shut-off valve 110 extends between the first refrigerant-to-coolant heat exchanger 20 and first expansion device 22 and the second air-to-coolant heat exchange 54 and the second expansion device 32. In operation, the high temperature, high pressure vapor refrigerant leaves the compressor 16 via a discharge port 19, as shown by action arrow 18, and flows through the refrigerant-to-coolant heat exchanger 20 to the first expansion valve 22 and the second shutoff valve 110. The refrigerant-to-coolant heat exchanger 20 functions as a condenser described above to cool the high-pressure, high-temperature vapor refrigerant discharged from the compressor 16. The cooled, high-pressure refrigerant, most time in liquid state, then flows to the first expansion valve 22, as shown by action arrow 24, where the control module 26 signals the first expansion valve to expand the refrigerant to become an intermediate-pressure, intermediate-temperature liquid and vapor refrigerant mixture which flows to the first separator valve 28.

As described in detail above with regard to utilization of the separator valves in the cooling and heating modes, the control module 28 determines whether the first separator valve 28 operates in a pass-through mode or a vapor injection mode in certain conditions. In this mode of operation, the first separator valve 28 operates in the vapor injection mode as described above and, with reference to FIG. 3, the intermediate-pressure, intermediate-temperature liquid and vapor refrigerant mixture enters the first separator valve 28 via inlet port 36. The magnetic valve 46 is energized to the closed position forcing the liquid and vapor refrigerant mix through the orifice 42 (shown by action arrow 47). The refrigerant passing through the orifice 42 is expanded lowering the pressure and the temperature thereof. The size of the opening of the orifice 42 determines the pressure (or temperature) of the refrigerant as is known in the art. Due to the expansion, the left side of the moveable component 49, which is in hydraulic contact with the outlet of the orifice 42 through conduit 58, now has a lower pressure than the right side of the moveable component 49, which is in hydraulic contact with the inlet of the separator valve 28 through conduit 60.

This pressure differential is sufficient to overcome the spring bias designed to maintain the regulating valve 48 in a closed position and to move the moveable component 49 within the regulating valve to the open position. This allows a vapor component separated from the liquid and vapor refrigerant mix via the separator chamber 40 to exit through the second outlet port 62, shown by action arrow 64, and flow to the second suction port 17 (or intermediate-pressure input port or injection port) of the compressor 16 as generally shown by action arrow 30 in FIG. 6. Again, the check valve 69 acts as a unidirectional valve and prevents backflow of the refrigerant into the second separator. The remaining liquid component passes through the orifice 42 and is expanded to another liquid and vapor refrigerant mix with lower pressure and temperature. The new low-temperature, low-pressure liquid and vapor refrigerant mix exits the first separator valve 28 via outlet port 50 and flows to the second, air-to-refrigerant, heat exchanger 54, as shown by action arrow 56.

In this parallel dehumidification and reheat mode, the second air-to-refrigerant heat exchanger 54 may function as an evaporator as is known in the art and described above. In this instance, the low-temperature, low-pressure liquid and vapor refrigerant mix discharged from the first separator valve 28 boils to a vapor, or mostly vapor (with some liquid), state due to heat transferred from warm air flowing across the second, air-to-refrigerant, heat exchanger 54 to the cooler refrigerant within the second, air-to-refrigerant, heat exchanger. The low-pressure, low-temperature refrigerant exits the second, air-to-refrigerant, heat exchanger 54, as shown by action arrow 116, and is directed to the accumulator 66 via the shutoff valve 68 which opens in this parallel dehumidification and reheat mode.

As noted above, the high temperature, high pressure vapor refrigerant leaving the compressor 16, as shown by action arrow 18, flows through the refrigerant-to-coolant heat exchanger 20 to the first expansion valve 22 and the second shutoff valve 110. In this mode, the second shutoff valve 110 is in an open state allowing the high temperature, high pressure, most time liquid, refrigerant to also flow to the second expansion valve 32. In the second expansion valve 32, the high-pressure refrigerant is expanded to become a low-pressure, low-temperature liquid and vapor refrigerant mixture and supplied to the second separator valve 34.

In this mode of operation, the second separator valve 34 operates in the pass-through mode as described above. In this mode, with reference to FIG. 2, the refrigerant passes through the second separator valve 34 without the valve actively separating the refrigerant into gaseous and liquid components and the liquid and vapor refrigerant mix exits through outlet port 50 as shown by action arrow 52. Returning to FIG. 6, the liquid and vapor refrigerant mix exiting the second separator valve 34 via outlet port 50 flows to the third air-to-refrigerant heat exchanger 72, as shown by action arrow 94.

In this parallel dehumidification and reheat mode, the third air-to-refrigerant heat exchanger 72 functions as an evaporator as is known in the art and described above. The third air-to-refrigerant heat exchanger 72 is positioned within the HVAC case 100 and used to cool or dehumidify a passenger compartment (not shown). Warm, moist air flowing across the third air-to-refrigerant heat exchanger 72 (as shown by arrow 102) transfers its heat to the cooler refrigerant within the third air-to-refrigerant heat exchanger. The byproducts are a lowered temperature air and condensation from the air which is routed from the third air-to-refrigerant heat exchanger 72 to an exterior of the vehicle (V). In this mode, however, the blower 98 may blow air across the third air-to-refrigerant heat exchanger 72 and the fourth air-to refrigerant heat exchanger 80. As is further described below, this process results in the passenger compartment having a warm but drier air therein.

Within the third air-to-refrigerant heat exchanger 72, the low-pressure, low-temperature liquid and vapor refrigerant mixture boils to a vapor, or mostly vapor (with some liquid), state due to the heat removed from the air. The resulting low-pressure, low-temperature vapor refrigerant exits the third air-to-refrigerant heat exchanger 72 and flows toward the accumulator 66, as shown by action arrow 74.

In the described embodiment, the pressure regulating valve 104 is utilized to monitor or control a state or phase of the refrigerant in the third air-to-refrigerant heat exchanger 72 as described in detail above.

In addition, the control module 26 directs the pump 88 to pump coolant within the coolant loop 14 through the first refrigerant-to-coolant heat exchanger 20 and the fourth air-to-coolant heat exchanger 80 which functions as a heater core. As is known in the art, the fourth air-to-coolant heat exchanger 80 is positioned within the HVAC case 100 and is used to warm the dehumidified air entering the passenger compartment as eluded to above. Cooled, dried air flowing across the fourth air-to-coolant heat exchanger 80 (as shown by arrow 108) absorbs heat from the warm coolant thereby increasing the temperature of the air.

Within the fourth air-to-coolant heat exchanger 80, the warm coolant is cooled due to the heat given to the air and directed back to the refrigerant-to-coolant heat exchanger 20 (as shown by action arrow 90). In the first refrigerant-to-coolant heat exchanger 20, the cooled coolant is again warmed by absorbing heat from the refrigerant in the refrigerant loop 12 and cycled through the coolant loop 14.

In still other embodiments, the embodiments described above may be operated in still other modes of operation whether the first and/or second separator valves 28, 34 are operating in the pass-through mode or the vapor injection mode. All such modifications and variations are within the scope of the appended claims when interpreted in accordance with the breadth to which they are fairly, legally and equitably entitled.

What is claimed:

1. A vapor injection heat pump operating in at least a first and a second mode of operation, comprising:
a compressor for compressing a refrigerant;
a first heat exchanger receiving a refrigerant output by the compressor;
a first expansion valve receiving the refrigerant output by the first heat exchanger and (1) directing the refrigerant to a first separator valve when the vapor injection heat pump is in the first mode of operation or (2) expanding the refrigerant into a first liquid and vapor refrigerant mix output to the first separator valve when the vapor injection heat pump is in the second mode of operation, the first separator valve receiving the refrigerant or the first liquid and vapor refrigerant mix output by the first expansion valve and (1) directing the refrigerant to a second heat exchanger when the vapor injection heat pump is in one of the first or second mode of operation or (2) separating a vapor component of the first liquid and vapor refrigerant mix and injecting the separated vapor component into a second port of the compressor and directing a liquid component of the first liquid and vapor refrigerant mix to an orifice of the first separator valve and expanding the liquid component into a second liquid and vapor refrigerant mix and directing the second liquid and vapor refrigerant mix to the second heat exchanger when the vapor injection heat pump is in the other one of the first or second mode of operation;
a valve positioned between the second heat exchanger and a first port of the compressor, said valve allowing refrigerant output by the second heat exchanger to flow to the first port of the compressor when the vapor injection heat pump is in one of the first or second mode of operation or flow to a second expansion valve when the vapor injection heat pump is in the other one of the first or second mode of operation, the second expansion valve receiving the refrigerant output by the second heat exchanger and (1) directing the refrigerant to a second separator valve when the vapor injection heat pump is in one of the first or second mode of operation or (2) expanding the refrigerant into a third liquid and vapor refrigerant mix output to the second separator valve when the vapor injection heat pump is in the other one of the first or second mode of operation, the second separator valve receiving the refrigerant or the third liquid and vapor refrigerant mix output by the second expansion valve and (1) directing the refrigerant to a third heat exchanger when the vapor injection heat pump is in one of the first or second mode of operation or (2) separating a vapor component of the third liquid and vapor refrigerant mix and injecting the separated vapor component into the second port of the compressor and directing a liquid component of the third liquid and vapor refrigerant mix to an orifice of the second separator valve which expands the liquid component into a fourth liquid and vapor refrigerant mix and directing the fourth liquid and vapor refrigerant mix to the third heat exchanger when the vapor injection heat pump is in the other one of the first or second mode of operation; and a control module controlling at least the valve, the first and second expansion valves, and the first and second separator valves when the vapor injection heat pump is in the first or the second mode of operation.

2. The vapor injection heat pump of claim 1, further comprising an accumulator receiving refrigerant output by the second heat exchanger when the vapor injection heat pump is in one of the first or second mode of operation or the third heat exchanger when the vapor injection heat pump is in the other one of the first or second mode of operation and directing a vapor component of the refrigerant output by the second heat exchanger or the third heat exchanger to the first port of the compressor.

3. The vapor injection heat pump of claim 2, further comprising a check valve between the second separator valve and the second port of the compressor to prevent backflow into the second separator valve.

4. The vapor injection heat pump of claim 3, wherein the first heat exchanger is a refrigerant-to-coolant heat exchanger and the second and third heat exchangers are air-to-refrigerant heat exchangers.

5. The vapor injection heat pump of claim 3, wherein the first heat exchanger is a refrigerant-to-air heat exchanger positioned within a heating, ventilation, and air conditioning (HVAC) case of a vehicle.

6. The vapor injection heat pump of claim 4, further comprising a coolant loop including the first heat exchanger and a fourth heat exchanger through which a coolant is pumped when the vapor injection heat pump is in the first or the second mode of operation.

7. The vapor injection heat pump of claim 1, wherein the at least a first and a second mode of operation include a first and a second cooling mode of operation, and wherein the refrigerant output by the compressor flows through the first heat exchanger, the first expansion valve, and the first separator valve in the first and the second cooling mode of operation.

8. The vapor injection heat pump of claim 7, wherein the second expansion valve expands the refrigerant output by the second heat exchanger into the third liquid and vapor refrigerant mix and the second separator valve separates the vapor component of the third liquid and vapor refrigerant mix and injects the separated vapor component into the second port of the compressor and directs the liquid component of the third liquid and vapor refrigerant mix to the orifice of the second separator valve which expands the liquid component into the fourth liquid and vapor refrigerant mix and directs the fourth liquid and vapor refrigerant mix to the third heat exchanger in the first cooling mode of operation.

9. The vapor injection heat pump of claim 7, wherein the second expansion valve expands the refrigerant output by the second heat exchanger and the second separator valve directs an entire expanded refrigerant output by the second heat exchanger to the third heat exchanger in the second cooling mode of operation.

10. The vapor injection heat pump of claim 1, further comprising a coolant loop including the first heat exchanger and a fourth heat exchanger through which a coolant is pumped when the vapor injection heat pump is in the first or the second mode of operation.

11. The vapor injection heat pump of claim 1, wherein the at least a first and a second mode of operation include a first and a second heating mode of operation, and wherein the refrigerant output by the second heat exchanger flows through the valve to the accumulator in the first and the second heating mode of operation.

12. The vapor injection heat pump of claim 11, wherein the first expansion valve expands the refrigerant output by the first heat exchanger into the first liquid and vapor refrigerant mix and the first separator valve separates the vapor component of the first liquid and vapor refrigerant mix output by the first expansion valve and injects the separated vapor component into the second port of the compressor and directs the liquid component of the first separator valve and expands the liquid component into the second liquid and vapor refrigerant mix and directs the second liquid and vapor refrigerant mix to the second heat exchanger in the first heating mode of operation.

13. The vapor injection heat pump of claim 11, wherein the first expansion valve expands the refrigerant output by the first heat exchanger and the first separator valve directs an entire expanded refrigerant output by the first heat exchanger to the second heat exchanger in the second heating mode of operation.

14. A method of heating and cooling a vehicle comprising the steps of:
providing a vapor injection heat pump operating in at least a first mode of operation and a second mode of operation;
compressing a refrigerant;
receiving a refrigerant output by the compressor in a first heat exchanger;
receiving the refrigerant output by the first heat exchanger in a first expansion valve and (1) directing the refrigerant to a first separator valve when the vapor injection heat pump is in the first mode of operation or (2) expanding the refrigerant into a first liquid and vapor refrigerant mix output to the first separator valve when the vapor injection heat pump is in the second mode of operation;
receiving the refrigerant or first liquid and vapor refrigerant mix output by the first expansion valve in the first separator valve and (1) directing the refrigerant to a second heat exchanger when the vapor injection heat pump is in one of the first or second mode of operation or (2) separating a vapor component of the first liquid and vapor refrigerant mix and injecting the separated vapor component into a second port of the compressor and directing a liquid component of the first liquid and vapor refrigerant mix to an orifice of the first separator valve and expanding the liquid component into a second liquid and vapor refrigerant mix and directing the second liquid and vapor refrigerant mix to the second heat exchanger when the vapor injection heat pump is in the other one of the first or second mode of operation;
directing the flow of refrigerant output by the second heat exchanger using a valve positioned between the second heat exchanger and a first port of the compressor to the first port of the compressor when the vapor injection heat pump is in one of the first or second mode of operation or a second expansion valve when the vapor injection heat pump is in the other one of the first or second mode of operation;
receiving the refrigerant output by the second heat exchanger in a second expansion valve and (1) directing the refrigerant to a second separator valve when the vapor injection heat pump is in one of the first or second mode of operation or (2) expanding the refrigerant output by the second heat exchanger into a third liquid and vapor refrigerant mix output to the second separator valve when the vapor injection heat pump is in the other one of the first or second mode of operation;

receiving the refrigerant or third liquid and vapor refrigerant mix output by the second expansion valve in the second separator valve and (1) directing the refrigerant to a third heat exchanger when the vapor injection heat pump is in one of the first or second mode of operation or (2) separating a vapor component of the third liquid and vapor refrigerant mix output by the second expansion valve and injecting the separated vapor component into the second port of the compressor and directing a liquid component of the third liquid and vapor refrigerant mix output by the second expansion valve to an orifice of the second separator valve and expanding the liquid component into a fourth liquid and vapor refrigerant mix and directing the fourth liquid and vapor refrigerant mix to the third heat exchanger when the vapor injection heat pump is in the other one of the first or second mode of operation; and controlling at least the valve, the first and second expansion valves, and the first and second separator valves.

15. The method of heating and cooling a vehicle of claim 14, wherein the at least a first and a second mode of operation include a first and a second cooling mode of operation, and wherein the refrigerant output by the compressor flows through the first heat exchanger, the first expansion valve, and the first separator valve in the first and the second cooling mode of operation.

16. The method of heating and cooling a vehicle of claim 15, wherein the second expansion valve expands the refrigerant output by the second heat exchanger into the third liquid and vapor refrigerant mix and the second separator valve separates a vapor component of the third liquid and vapor refrigerant mix output by the second expansion valve and injects the separated vapor component into the second port of the compressor and directs a liquid component of the third liquid and vapor refrigerant mix output by the second expansion valve to the orifice of the second separator valve and expands the liquid component into the fourth liquid and vapor refrigerant mix and directs the fourth liquid and vapor refrigerant mix to the third heat exchanger in the first cooling mode of operation.

17. The method of heating and cooling a vehicle of claim 15, wherein the second expansion valve expands the refrigerant output by the second heat exchanger and the second separator valve directs an entire expanded refrigerant output by the second heat exchanger to the third heat exchanger in the second cooling mode of operation.

* * * * *